United States Patent [19]

Veh

[11] 3,814,133
[45] June 4, 1974

[54] SOLENOID OPERATED COMPRESSED AIR VALVE
[75] Inventor: Herbert Veh, Oberuhldingen, Germany
[73] Assignee: Elecktroteile GmbH, Bodensee, Germany
[22] Filed: Nov. 17, 1972
[21] Appl. No.: 307,468

[30] Foreign Application Priority Data
Nov. 19, 1971 Germany.......................... 2157522

[52] U.S. Cl. .............................................. 137/625.65
[51] Int. Cl. .............................................. F16l 11/02
[58] Field of Search..... 137/625.64, 625.65, 596.17, 137/625.27, 625.3, 625.6, 625.9, 505.44, 505.45, 625.48, 625.50, 540; 251/65, 333

[56] References Cited
UNITED STATES PATENTS
1,887,578  11/1932  Bush .......................... 137/505.45 X
2,300,263  10/1942  McLeod .................... 137/596.17 X
3,303,854   2/1967  Churchill ...................... 137/625.65
3,349,800  10/1967  Herion et al. .............. 137/625.48 X
3,534,772  10/1970  Stampeli .................... 137/625.65 X
3,635,248   1/1972  Klee ............................... 137/625.5
3,677,298   7/1972  Greenwood ................ 137/505.45 X Primary Examiner—Alan Cohan
Assistant Examiner—Robert J. Miller
Attorney, Agent, or Firm—Ostrolenk, Faber, Gerb & Soffen

[57] ABSTRACT

A compressed air valve comprises valve plates which are arranged to be moved by a coaxially arranged solenoid with a plunger. The valve plates are held in valve holders which are connected together by feet which abut against each other and extend in holes in a valve block.

6 Claims, 4 Drawing Figures

Fig. 2
Fig. 3
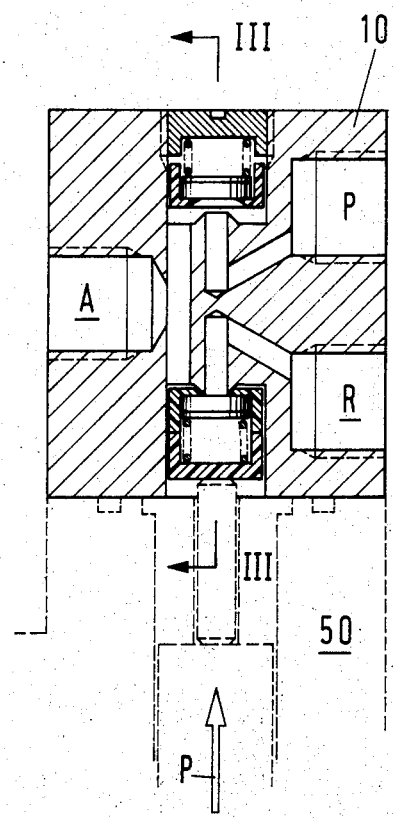
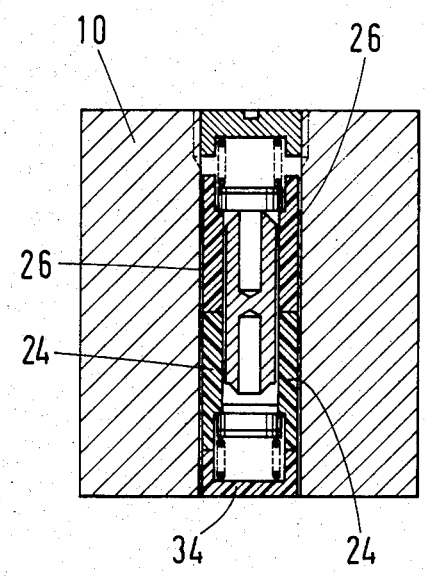
Fig. 4
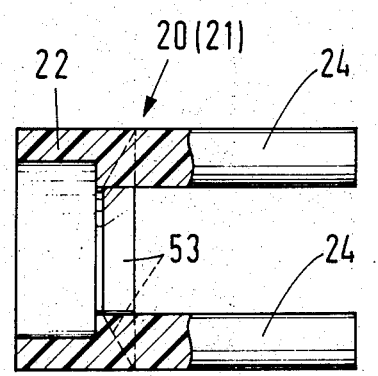

3,814,133

SOLENOID OPERATED COMPRESSED AIR VALVE

Background of Invention

1. Field to which Invention Relates

The invention relates to an electromagnetically operated three way compressed air valve for servo-installations with two coaxially arranged valves, whose valve bodies are arranged for sliding movement and can be actuated by means of the armature, arranged in a pressure-sealed space, of the solenoid or electromagnet.

2. Summary of Invention

One aim of the invention is to provide a compressed air solenoid valve with a compact construction which can be produced both in a DC and also in an AC version. Furthermore, such a valve should be simple in construction and be suitable for mass production while nevertheless ensuring satisfactory switching operation without any leaks in operation.

In the case of a compressed air solenoid valve of the above-mentioned type the invention provides, in accordance with one aspect, a bell-shaped valve holder with an opening at the bottom, for guiding each valve body, which are respectively guided at opposite ends of the valve housing for a sliding movement and have feet for acting as abutments at their adjacent bottoms, which can be slid in holes, separate from the pressure ducts, in the valve housing. The valve holder, which lies against the solenoid, and can be actuated by the armature, is adapted to transmit the switching movement in a positive manner to the other valve holder against the force of a return spring.

List of Several Views of Drawings

In what follows an embodiment of the invention will be described with reference to the drawings.

FIG. 2 is a sectional view, corresponding to FIG. 1, showing the valve in the excited or energized condition of the solenoid.

FIG. 3 is a section on the line III—III in accordance with FIG. 2.

FIG. 4 shows on a larger scale a sectional view of a valve holder.

Description of Preferred Embodiments

Figure 1:
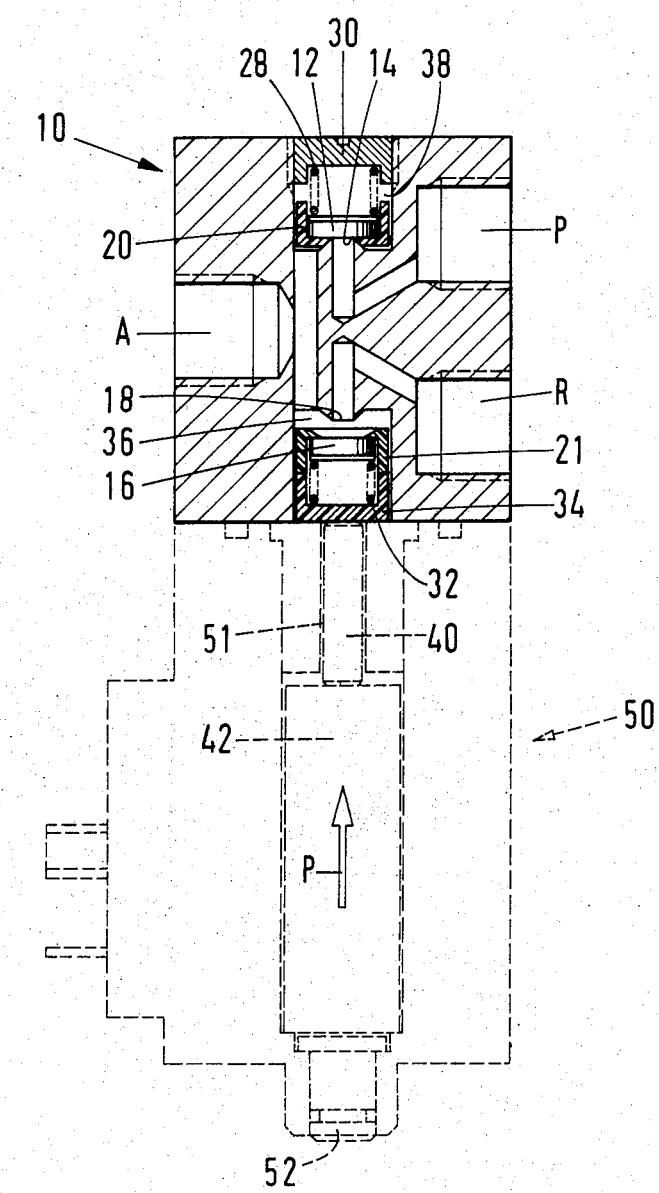
FIG. 1 is a sectional view of a three way compressed air solenoid valve in accordance with the invention in the non-excited operational state or switching position.

The valve housing 10 is provided with three compressed air connections P, R, and A, of which the connections P and R can be connected alternately with the connection A. Such a compressed air valve can for example be used for controlling the operation of a piston actuator. In this case the drive cylinder of such an actuator is connected with the connection A while the connection P is connected with the compressor or another source of compressed air and the connection R serves for venting. In the non-energised or rest position in accordance with FIG. 1 the connections A and R are connected together for venting while P and A are disconnected from each other.

In the energized or excited operational state in accordance with FIG. 2 P and A are connected together while A and R disconnected from each other.

Between the connections A and P there is a nozzle 14 which can be blocked by a valve plate 12 and between the connections A and R there is a nozzle 18 which can be blocked by a valve plate 16. The valve plates 12 and 16, respectively, are guided for sliding movement in respective bell-shaped valve holders 20 and 21 so as to be able to move axially. This valve holder is shown in FIG. 4 in a larger scale. Each valve holder consists of a bell-shaped member 22 and two diametrically separated round support feet 24 which are parallel to the axis and lie in holes 26 of the valve housing for sliding movement in an axial direction. As is indicated in FIG. 3 the ends of the support feet 24 abut against each other. It can also be seen that the valve holders and the valves are axially aligned. The valve plate 12 is urged by a helical spring 28 against the bottom of the bell of the valve holder which is provided with an opening. The helical spring 28 abuts against a screw-threaded plug 30 which is screwed into a threaded hole in the valve housing.

The valve plate 16 is urged by a helical compressor spring 32 against the bottom of the bell and the other end of this spring rests against the bottom of a cap 34, which can be displaced in a hole 36 in the housing, which also serves for axial guidance of the valve holder 21. The valve holder 20 cooperating with the valve plate 12 is guided for axial sliding movement in a hole 38. In order to ensure that the pressure of the spring is evenly distributed to the valve plates; between the latter and the spring a steel disc is placed.

The solenoid housing 50 is fixed to the valve housing 10 and the hole 36 in the housing adjoins a hole 51 in the solenoid housing 50. In this hole 51 an actuating plunger 40 is arranged for axial sliding movement and its front end abuts against the cap 34. The plunger 40 is acted upon by the armature 42 of the solenoid or electromagnet and displaces the latter on energization in the direction of the arrow P. The space, in which the armature 42 can be displaced, is connected with the holes guiding the valve holders and with the connection A.

On energization or actuation of the armature 42 the latter displaces the plunger 40 in direction of the arrow P and the latter displaces via the cap 34 and the valve holder 21 the valve holder 20 against the force of the spring 28. The force of the spring 28 is greater than the force of the spring 32 so that when the magnetic force actuating the armature 42 is discontinued, the individual components return into the position shown in FIG. 1.

Manual operation of the valve is via the hand knob 52 mounted in the housing 50.

The sealing side of the valve holders is in each case provided with a conical shoulder or seating 53 in order to offer as little hydrodynamic resistance as possible.

The valve holders 20, 21 are preferably made of plastic material by injection molding or pressing.

The valve operates as follows:

In the non-energized or non-excited state of the solenoid (as seen in FIG. 1) the spring 28 presses the valve plate 12 against the valve seating the closes the nozzle 14. Simultaneously the valve holder 20 as shown in FIG. 1 is pressed downwards and its feet act against the feet of the valve holder 21 and press the latter downwards so that the valve plate 16 is moved downwards and the spring 32 is compressed. Owing to the force of the spring 28 the armature 42 of the solenoid is moved into the position as shown in FIG. 1. In this case the connection A is connected with the connection R.

On excitation or energization of the solenoid the armature 42 is displaced in the direction of the arrow P and the parts are moved over into the position in accordance with FIG. 2, in which the connections A and P are joined with each other. In this post the spring 32 presses the valve plate 16 onto its valve seating so that the nozzle 18 is shut off while the valve holder 20 has raised the valve plate 12 positively against the action of its closing spring 28.

I claim:

1. A solenoid operated compressed air valve, comprising:

a valve housing, within which are located first and second coaxial bores that are spaced apart; each said bore has a respective interior end; a respective pressure passage communicating with each said bore interior end; an inlet passage communicating with both said bore interior ends;

in said first bore is positioned a respective first valve holder; in said second bore is positioned a respective second valve holder; each said valve holder has a bottom side facing the respective said bore interior end; each said valve holder having a passage through it communicating with the respective said pressure passage;

a valve element in each said bore and supported by the respective said valve holder on the side of said holder that is away from said interior end of that said bore;

said holders being shiftable toward and away from their respective said bore ends and said bores being of an axial length sufficient to accommodate such movement of said holders;

feet project from each said holder bottom side; the feet on each said holder are located so that and are of a length so that the ends of the respective feet on each said holder may normally abut each other; said feet being of a length and said bores being of a length such that with said holders in said bores, said feet can remain abutting as said holders shift;

feet receiving bores which are separate from said pressure passages pass through said housing and extend between said coaxial holder bores; said feet receiving bores are shaped closely to the exterior contour of said feet and said feet can slide therethrough and are guided thereby;

apart from said valve housing is an electromagnetically operated solenoid having an armature which is positioned adjacent said first valve holder to engage and activate same by moving toward said first valve holder and shifting it; said abutting feet causing said second valve holder to correspondingly shift;

a return spring operatively connected to and applying force to said second valve holder to move said valve holders against the movement caused by activation of said armature.

2. The pressure valve of claim 1, further comprising a first valve seat at the said bore interior end of said first bore and a second valve seat at said bore interior end of said second bore; said valve seats being adapted to cooperatively seal against the respective said valve element when the respective said valve holder is moved toward the respective said bore interior end; said inlet passage and the respective said pressure passage communicates with each said valve seat to be sealed by sealing movement of the respective said valve element;

said return spring acting upon said second valve holder to move its respective said valve element to said second valve seat;

a valve spring connected with said first valve holder for moving its respective said valve element toward said first valve seat;

said return and valve springs acting in opposition and said return spring having a higher spring constant than said valve spring.

3. The pressure valve of claim 1, wherein said first valve holder includes a cap thereover on the side of its respective said valve element away from its respective said bore interior end which said cap is engaged by said armature.

4. The pressure valve as claimed in claim 2, wherein an axially adjustable screw plug is inserted into said valve housing at a location to define an end of said first bore which end is opposite said first bore interior end;

said valve spring is a compression spring which, on the one hand, presses against said first valve holder and its said valve element and on the other hand presses against said screw plug.

5. The pressure valve as claimed in claim 2, wherein each said valve seat is conically shaped, tapering narrower toward the respective said valve element.

6. The structure as set forth in claim 1, in which said valve holders consist of plastic material.

* * * * *